United States Patent [19]
DeSantis

[11] Patent Number: 5,010,824
[45] Date of Patent: Apr. 30, 1991

[54] LINEARLY MOVABLE TOOL OR WORK HANDLING UNIT

[75] Inventor: Raymond P. DeSantis, Troy, Mich.

[73] Assignee: PTX-Pentronix, Inc., Lincoln Park, Mich.

[21] Appl. No.: 446,191

[22] Filed: Dec. 4, 1989

[51] Int. Cl.⁵ .............................................. F16C 32/06
[52] U.S. Cl. ................... 104/23.001; 105/63; 384/12
[58] Field of Search ............ 104/23.1, 23.2, 134, 104/155, 156, 157, 158, 160; 105/63, 64.1; 384/12, 13; 248/429; 108/137, 143

[56] References Cited

U.S. PATENT DOCUMENTS

| | | | |
|---|---|---|---|
| 3,432,213 | 3/1969 | Adams | 384/12 |
| 4,506,935 | 3/1985 | Suzuki et al. | 384/12 |

FOREIGN PATENT DOCUMENTS

| | | | |
|---|---|---|---|
| 0222670 | 5/1985 | Fed. Rep. of Germany | 384/12 |
| 0086713 | 5/1984 | Japan | 384/12 |
| 1107721 | 3/1968 | United Kingdom | 384/12 |

*Primary Examiner*—Robert J. Oberleitner
*Assistant Examiner*—Mark T. Le
*Attorney, Agent, or Firm*—Gifford, Groh, Sprinkle, Patmore and Anderson

[57] ABSTRACT

A linearly movable tool or work piece handling unit capable of operation in an abrasive particle atmosphere includes a carriage supported on parallel ways by an air bearing structure.

12 Claims, 1 Drawing Sheet

LINEARLY MOVABLE TOOL OR WORK HANDLING UNIT

BACKGROUND OF THE INVENTION

1. Field Of The Invention

This invention relates to a part or tool moving unit. More particularly it relates to a linearly movable carriage which is moved on ways for precise positioning which is operated in an atmosphere containing abrasive particles.

2. Description Of The Prior Art

In my U.S. Pat. Nos. 4,550,551, 4,553,375, 4,569,183 and 4,722,169 I have set forth the operation of the various elements and mechanisms utilized in a conveying and part transfer or loader system in which powder compacted articles such as spark plug bodies or insulators are conveyed from a compacting press to be automatically loaded in a specific arrangement of rows in a sagger. The sagger is then conveyed to and through a firing or sintering furnace to transform the "green" bodies held together by a binder into finish stable parts. Often inserts are used in the sagger to properly position and hold the bodies in alternate staggered rows. All this requires precision detection and positioning of the sagger and insert coupled with precise pick up of the parts by a loader and movement of precise distances to perform the loading. One of the key mechanisms of this system is the part pick up unit which employs a slide or carriage which must be rapidly reciprocated, smoothly and precisely. Such precision and smooth operation is obtained by supporting the carriage on cylindrical ways by the use of linear ball bearings.

Unfortunately the fine aluminum oxide powder from which the bodies are pressed is abrasive and gets into the atmosphere from part breakage and handling abrading. This eventually causes failure of the ball bearings. Even with improvements in bearing design, for example, by substituting nylon balls for the commonly used steel balls, the life can be relatively short. With a bearing using steel balls failure can occur in as little as 100,000 cycles whereas with the use of nylon balls this life can be increased to 750,000 to one million cycles. However with a handling speed of one part per second, failure can occur in one month or less. Various sealing and purging techniques have been attempted to improve life with little success. It is to the solution of this limited life problem for a linear actuater that the present invention is directed.

SUMMARY OF THE INVENTION

The linearly movable tool or work piece handling unit of the present invention is capable of operating in an abrasive particle atmosphere for a period of time which is vastly improved over those employing linear ball bearing, the new unit having an almost indefinite life. A pair of longitudinally extending spaced parallel cylindrical ways are supported relative to each other at both of their ends. A bushing surrounds each of the ways to define a pneumatic bearing gap between the way and the bushing with an annular opening to discharge air at both ends of the bushing. An additional air outlet is provided intermediate the ends of the bushing in communication with the gap. Each bushing has an array of circumferentially spaced radial input orifices adjacent to each end of the bushing and an intermediate array adjacent to each side of the air outlet for the introduction of pressurized air towards the ways to the pneumatic bearing gap. This defines a cylindrical pressure pad in the pneumatic gap between each end array of nozzles and an intermediate array of nozzles. A carriage having a pair of parallel bores receives the bushing and ways for reciprocating movement of the carriage along the ways. Suitable passages are provided in the carriage for supplying pressurized air to the orifices and for removing the air from the air outlet.

Each bushing is sealed on a circumferential or cylindrical land surface adjacent to both of its ends to the carriage. The bushing is also sealed by a circumferential intermediate seal between each intermediate array of orifices and the air outlet. An annular or cylindrical air inlet channel is provided between each end seal and intermediate seal and an inlet conduit to each of the channels provides the means for introducing the pressurized air to the array of orifices adjacent one end of the bushing and an intermediate array of orifices. A similar annular or cylindrical air outlet channel is provided between the intermediate seals on each bushing. The air outlet itself can include a plurality of circumferentially spaced ports between the air gap and this annular outlet channel. Preferably this includes four equally spaced ports. The outlet channel is vented to atmosphere.

In the preferred form, the bushings are made with an aluminum alloy for operation with ground steel cylindrical ways. The bushings will receive an anodizing surface treatment to produce a hardened abrasion resistant internal surface. Preferably the anodized coating is Teflon impregnated to reduce friction during start and stop of the unit.

In the preferred form of the invention the air gap is relatively large compared to a typical fluid bearing. This radial clearance preferably is between 0.0005 inch and 0.003 inch.

The invention provides a virtually abrasion resistant linear work transfer unit in which a carriage or slide is supported on each of two spaced parallel ways by a pair of longitudinally spaced pneumatic pressure pads and the high velocity air streams emitted from an array of inlet nozzles at each end of each pressure pad. The flow of pressurized air to and away from each end of each pressure pad produces a self cleaning and purging effect so that the unit can be operated continuously in an atmosphere containing abrasive particles.

The already mentioned advantages and others will become more apparent from the following description and the accompanying drawing.

DETAILED DESCRIPTION OF THE PRESENTLY PREFERRED EMBODIMENT OF THE INVENTION

Figure 1:
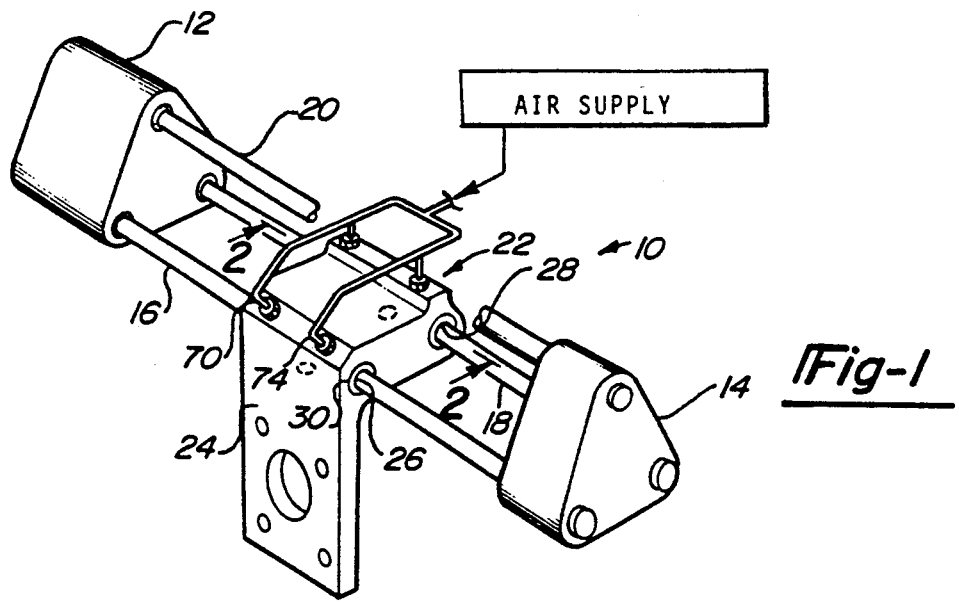
FIG. 1 is a perspective view of the linearly movable tool or work piece handling unit of this invention.

As seen in FIG. 1 the work piece handling unit 10 comprises a pair of spaced support blocks or housings 12 and 14 supporting the opposite ends of longitudinally extending parallel ground and polished steel ways 16 and 18. An additional support rod 20 extends longitudinally parallel to the ways 16 and 18 providing a substantially triangular strong, sturdy and rigid assembly which supports carriage or slide 22 for reciprocating movement on the ways 16 and 18. Movement of carriage 22 can be affected in any well known manner such as by the use of a stepping motor, not shown, contained within the housing 12 driving a timing belt, not shown, connected to the carriage. Such an arrangement is shown and described in my above mentioned patents. The work or tool handling device can be bolted to the depending mounting bracket 24 in a manner described in my patents.

Carriage 22 has a pair of parallel bores 26 and 28 which are spaced to receive ways 16 and 18 respectively. A bushing 30 is received in each of two longitudinally extending carriage bores 26 and 28. The bushings are sealed in the bores at each of their ends at circumferential or cylindrical lands 32 and 34 with a bonding agent such as Locktite.

The inside diameter 36 of bushing 30 is finished to have a size after hard coating larger than the outside diameter of ways 16 and 18 to produce an annular air gap 38 when pressurized air is admitted to this area as will be described. I have found that an air gap between 0.0005 inch and 0.003 inch to be very satisfactory, both from the stand point of maintaining the bushing and ways free from abrasive wear and from the over all problem of aligning the ways and support rod between the blocks or housings 12 and 14.

Figure 2:
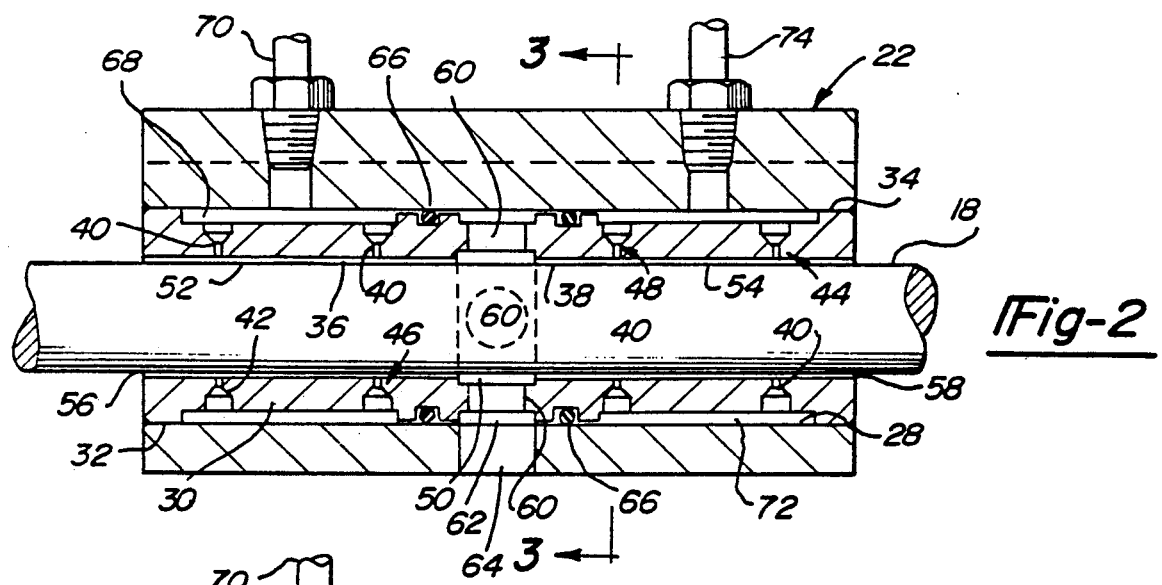
FIG. 2 is a vertical sectional view taken along line 2—2 of FIG. 1 showing the details of the air passages and the pressure pad support of the carriage on one of the two parallel ways for reciprocation thereon.
Figure 3:
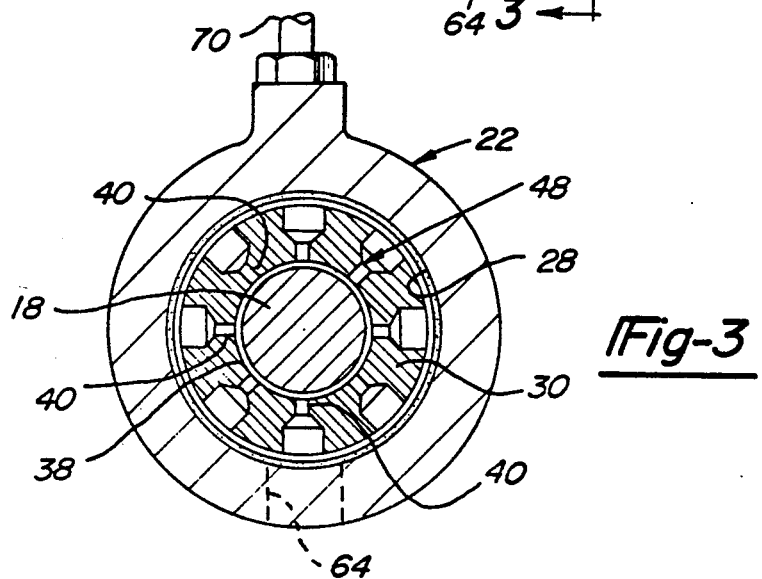
FIG. 3 is a cross sectional view taken along line 3—3 of FIG. 2 showing one of the four annular arrays of orifices applying pressurized air to the pneumatic bearing gap of the invention.

Referring to FIGS. 2 and 3, circumferential arrays 42 and 44 of inlet orifices 40 are located adjacent to each end of the bushing 30. Circumferential arrays 46 and 48 of inlet orifices 40 are also located adjacent a midpoint of bushing 30 on both sides of an annular air outlet 50. Each of these circumferential arrays 42, 44, 46 and 48 contain at least four equally spaced inlet orifices 40, and preferably as shown in FIG. 3, eight equally orifices 40 are used to introduce the pressurized air toward the ways 16 and 18 establishing the pneumatic bearings or air gaps between the ways and bushings 30. The pressurized air introduced through the equally spaced inlet orifices 40 support the carriage 22 by the high velocity, high kinetic energy impingement of the air from the orifices against the ways.

Pressure pads are created between adjacent circumferential arrays which also support and with the impinging jets from the orifices keep the carriage centered on the ways according to well known principles of fluid dynamics. As seen in FIG. 2, pressure pad 52 is formed between end circumferential array 42 and intermediate circumferential array 46, and pressure pad 54 is established between end circumferential array 44 and intermediate circumferential array 48. Air is exhausted at each end of bushing 30 through annular openings 56 and 58 of the air gap 38. Air is also exhausted from the air gap 38 at intermediate air outlet 50 through four equally spaced radial ports 60 to annular channel 62 and through exhaust passage 64. O-rings 66 on either side of annular passage 62 seal the passage with respect to bushing 30 and carriage 22. Pressurized air is supplied to adjacent end array 42 and intermediate array 46 by annular channel 68 through air conduit 70. Similarly pressurized is introduced to end array 44 and intermediate array 48 by annular channel 72 through air conduit 74.

In order to establish and maintain the accuracy required, the ways 16 and 18 are ground and polished steel. Primarily to minimize the weight of the entire unit 10 which is normally supported in a cantilevered fashion, the end blocks or housing 12 and 14 and carriage 22 are made with an aluminum alloy. Bushings 30 are also made with an aluminum alloy, and preferably one that is easily anodized such as 6061-T6. With nominal ⅜ inch diameter ways and an overall carriage and bushing width of 2½ inches and utilizing pressurized air from a conventional factory source at approximately 70 psi, the air inlet orifices will be of the order of 1/64 inch diameter.

The described unit of this invention employing an air bearing supported carriage accomplishes the extended life purpose of this invention in a hostile abrasive atmosphere.

I claim:

1. A linearly movable tool or work piece handling unit for operation in an abrasive particle atmosphere comprising:
   cylindrical ways supported relative to each other at both ends;
   a bushing surrounding each of said ways defining a pneumatic bearing gap between each of said ways and the bushing with an annular opening to atmosphere at both ends of said bushing and an air outlet intermediate the ends of said bushing in communication with said gap;
   said bushings each having an array of circumferentially spaced radial input orifices adjacent each end of said bushing and an intermediate array adjacent each side of said air outlet for introducing pressurized air to said pneumatic bearing gap which defines a cylindrical pressure pad in said bearing gap between each end array and intermediate array of orifices;
   a carriage receiving said bushings for movement of said carriage along said ways; and
   passage means in said carriage for supplying said pressurized air to said orifices and for removing air from said air outlet.

2. A linearly movable unit according to claim 1 wherein said bushings are received in parallel bores in said carriage and each bushing is sealed to said carriage by a circumferential end seal adjacent both of its ends and is sealed to said carriage by a circumferential intermediate seal between each intermediate array of orifices and said air outlet.

3. The linearly movable unit according to claim 2 wherein said passage means includes an annular air inlet channel between each end seal and intermediate seal and an inlet conduit through said carriage to each inlet channel for introducing said pressurized air to the array of orifices adjacent one end of said bushing and an intermediate array of orifices.

4. The linearly movable unit according to claim 3 wherein said passage means further includes an annular outlet channel between the intermediate seals on each bushing, said air outlet includes a plurality of circumferentially spaced ports between said air gap and said annular outlet channel, and said outlet channel is vented to atmosphere.

5. The linearly movable unit according to claim 1 wherein said bushings are made with an aluminum alloy and said cylindrical ways are made with a steel alloy.

6. The linearly movable unit according to claim 5 wherein said bushings are anodized producing a hardened, abrasive resistant internal surface which defines said pneumatic bearing gap with said way.

7. The linearly movable unit according to claim 6 wherein said bushings are anodized producing a Teflon impregnated hardened, abrasive resistant internal surface.

8. The linearly movable unit according to claim 1 wherein each of said arrays of circumferentially spaced radial input orifices include at least four equally spaced orifices.

9. The linearly movable unit according to claim 1 wherein said air gap is between 0.0005 inch and 0.003 inch.

10. A linearly movable work piece handling unit for operation in an abrasive particle atmosphere comprising:

a pair of longitudinally extending spaced parallel cylindrical ways supported relative to each other at both ends;

a pair of support housings for supporting the opposite ends of said ways;

a carriage having a pair of parallel bores spaced to receive said ways along the axes of said bores;

a support rod extending longitudinally parallel to said ways and connecting to said housings, said support rod and said ways providing a substantially triangular and rigid assembly supporting said carriage for reciprocating movement on said ways; and a pair longitudinally spaced and longitudinally extending pneumatic pressure pads in each of said bores supporting said carriage for reciprocating movement on each of said ways.

11. The linearly movable unit according to claim 10 wherein means is provided for supplying pressurized air to and exhausting it from each end of each pressure pad.

12. The linearly movable unit according to claim 11 wherein said means for supplying pressurized air to and exhausting it from each pressure pad includes an array of circumferentially spaced radial input orifices adjacent each end of each pressure pad.

* * * * *